UNITED STATES PATENT OFFICE.

HENRY W. ARMINGTON, OF DENVER, COLORADO.

INSECTICIDE.

SPECIFICATION forming part of Letters Patent No. 341,868, dated May 18, 1886.

Application filed March 8, 1886. Serial No. 194,437. (No specimens.)

*To all whom it may concern:*

Be it known that I, HENRY W. ARMINGTON, a citizen of the United States, residing at Denver, in the county of Arapahoe and State of Colorado, have invented certain new and useful Improvements in Insecticides; and I do hereby declare that the following is a full, clear, and exact description of the same.

The present invention has for its object to provide a compound for the extermination of insects; and it consists of the following ingredients, viz: borax, red lead, paris-green, sulphur, and sugar, in about equal parts. In their compound I first mix the borax, red lead, and paris-green thoroughly together, and afterward add the sulphur, which throws off a gas that the insects breathe and that quickly destroys them; the ingredients being mixed in a dry powdered state and applied with a bellows in the cracks and crevices of a room or other place.

The red lead is used for disguising the natural appearance of the compound and adding to its effectiveness when eaten by the insect, the sugar being added to render its condition attractive.

Having now fully described my invention, what I claim as new, and desire to secure by Letters Patent, is—

An insecticide compound consisting of borax, red lead, paris-green, sulphur, and sugar, substantially in the proportions named.

In testimony that I claim the above I have hereunto subscribed my name in the presence of two witnesses.

HENRY W. ARMINGTON.

Witnesses:
GEO. O. CHANEY,
C. A. EVERHART.